(12) United States Patent
Kerfoot

(10) Patent No.: US 6,780,329 B2
(45) Date of Patent: Aug. 24, 2004

(54) TREATING AN AQUIFER OR SOIL FORMATIONS

(76) Inventor: William B. Kerfoot, 49 Ransom Rd., Falmouth, MA (US) 02540

( * ) Notice: Subject to any disclaimer, the term of this patent is extended or adjusted under 35 U.S.C. 154(b) by 0 days.

(21) Appl. No.: 10/354,584

(22) Filed: Jan. 30, 2003

(65) Prior Publication Data

US 2003/0155288 A1 Aug. 21, 2003

Related U.S. Application Data

(62) Division of application No. 10/223,166, filed on Aug. 19, 2002, now Pat. No. 6,596,161, which is a continuation of application No. 09/470,167, filed on Dec. 22, 1999, now Pat. No. 6,436,285.

(51) Int. Cl.[7] .................................................. C02F 1/78
(52) U.S. Cl. ..................... 210/668; 210/691; 210/694; 210/759; 210/760; 210/763; 210/908; 405/128.5
(58) Field of Search ................................. 210/747, 759, 210/760, 691, 694, 668, 763, 909, 910; 261/122.1, DIG. 42, DIG. 70; 405/128.5, 128.75, 129.25

(56) References Cited

U.S. PATENT DOCUMENTS

| | | | |
|---|---|---|---|
| 5,126,111 A | * 6/1992 | Al-Ekabi et al. | 422/186.3 |
| 5,425,598 A | 6/1995 | Pennington | 405/118 |
| 5,620,593 A | 4/1997 | Stagner | 210/90 |
| 5,879,108 A | 3/1999 | Haddad | 405/128 |
| 5,967,230 A | 10/1999 | Cooper et al. | 166/245 |
| 6,436,285 B1 | * 8/2002 | Kerfoot | 210/199 |
| 6,447,676 B1 | * 9/2002 | Kerfoot | 210/170 |
| 6,582,611 B1 | * 6/2003 | Kerfoot | 210/747 |

FOREIGN PATENT DOCUMENTS

| | | |
|---|---|---|
| EP | 0 402 158 | 12/1990 |
| EP | 0 546 335 A1 | 6/1993 |
| WO | WO 98/21152 | 5/1998 |

* cited by examiner

Primary Examiner—Peter A. Hruskoci
(74) Attorney, Agent, or Firm—Fish & Richardson P.C.

(57) ABSTRACT

A microporous diffuser includes a first elongated member including at least one sidewall having a plurality of microscopic openings. The sidewall defines an interior hollow portion of the member. The diffuser has a second elongated member having a second sidewall having a plurality of microscopic openings, the second member being disposed through the hollow region of the first member. The diffuser includes an end cap to seal a first end of the microporous diffuser and an inlet cap disposed at a second end of microporous diffuser for receiving inlet fittings.

26 Claims, 12 Drawing Sheets

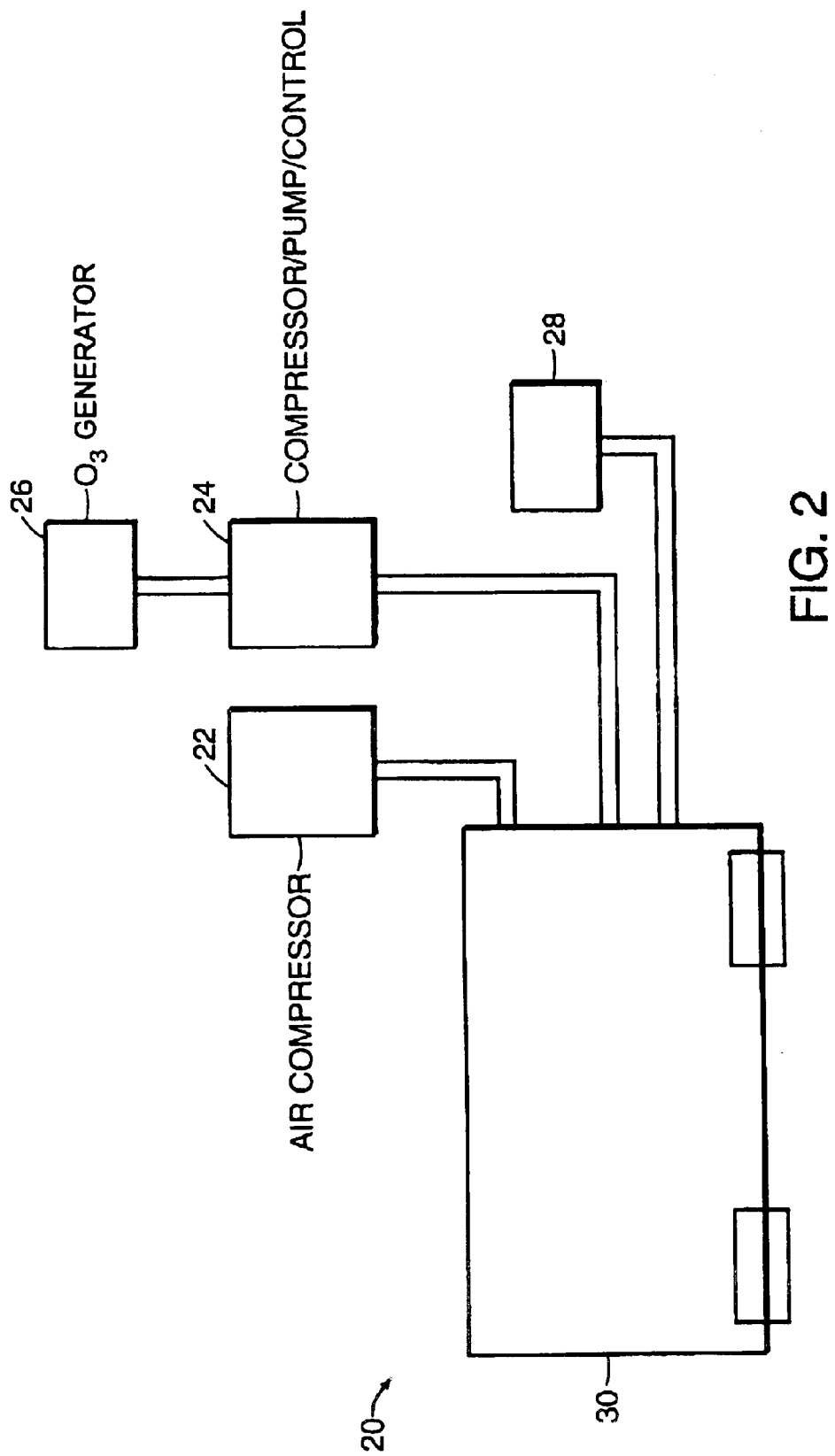

TREATING AN AQUIFER OR SOIL FORMATIONS

This application is a divisional of application Ser. No. 10/223,166 filed on Aug. 19, 2002, now U.S. Pat. No. 6,596,161 which was a continuation of application Ser. No. 09/470,167, filed Dec. 22, 1999 (U.S. Pat. No. 6,436,285).

BACKGROUND

This invention relates generally to water remediation systems.

There is a well recognized need to clean-up contaminants that exist in ground and surface water. In particular, there is one type of contamination problem which widely exists, that is, the contamination of surface waters or subsurface waters which find their way to the surface such as, for example, in a contaminated spring. Such surface waters may be contaminated with various constituents including volatile hydrocarbons, such as chlorinated hydrocarbons including trichloroethene (TCE), tetrachloroethene (PCE).

SUMMARY

According to an additional aspect of the present invention, a microporous diffuser includes a first elongated member including at least one sidewall having a plurality of microscopic openings, said sidewall defining an interior hollow portion of said member and a second elongated member having a second sidewall having a plurality of microscopic openings, said second member being disposed through the hollow region of said first member. The diffuser includes an end cap to seal a first end of the microporous diffuser and an inlet cap disposed at a second end of microporous diffuser for receiving inlet fittings.

According to an additional aspect of the present invention, a microporous diffuser includes a first hollow cylindrical tube having a sidewall comprising a plurality of microscopic openings and a second hollow tube having a sidewall having a plurality of microscopic openings, said second tube being disposed through said first tube. The diffuser also includes an end cap to seal ends of said tubes and an inlet cap disposed to provide inlets to interior portions formed by sidewalls of said tubes.

According to a still further aspect of the invention, a microporous diffuser includes a first hollow cylindrical tube coupled to a first inlet and adapted to be fed by a gas, the tube having a sidewall comprising a plurality of microscopic openings the openings having a diameter in a range of 1 to 200 microns and a second hollow tube coupled to a second inlet and adapted to be fed by a liquid, the tube having a sidewall with a plurality of microscopic openings, the openings having a diameter in a range of 1 to 200 microns, with the first tube being disposed through the second tube and arranged such that gas injected into the first tube travels towards the sidewall of the second tube forming microfine bubbles laminated with the liquid. The diffuser also includes an end cap to seal first ends of the tubes and an inlet cap disposed to seal second ends of said tubes and to support the first and second inlets to the interior portions formed between the tubes.

BRIEF DESCRIPTION OF THE DRAWINGS

FIG. 2 is a block diagram of an apparatus used in the treatment process.

DETAILED DESCRIPTION

Figure 1:
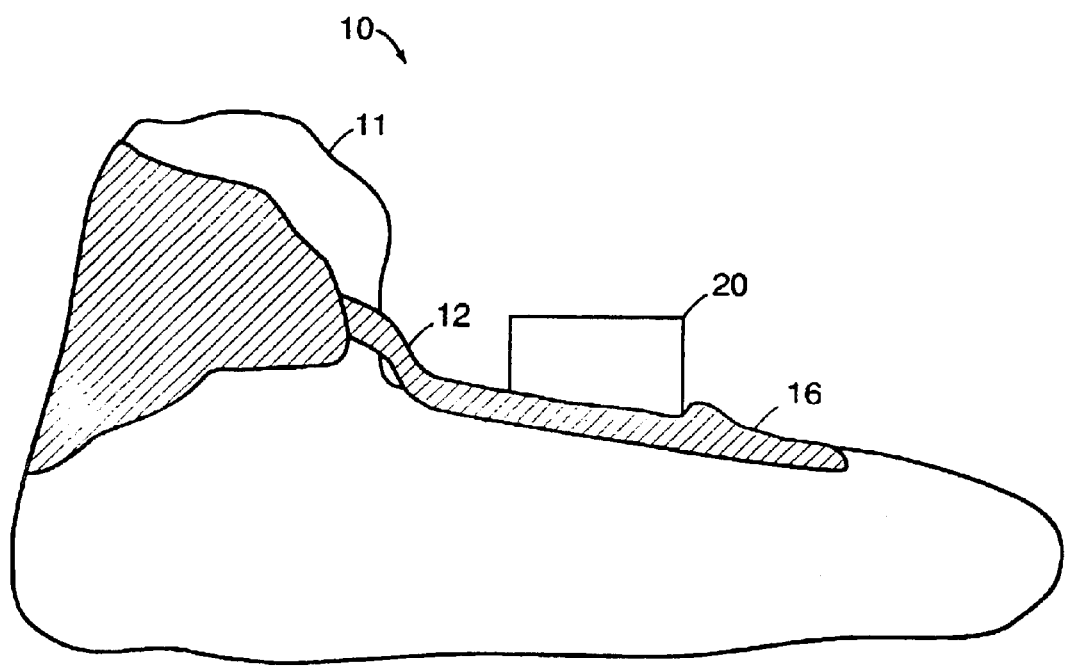
FIG. 1 is a diagrammatical view of a typical surface water treatment example.

Referring now to FIG. 1, an example 10 of the use of an apparatus for treatment of surface water or in-situ removal of contaminants from water is shown. Illustrated in FIG. 1 is a site 11, having a subsurface aquifer 14 that produces surface waters 12 such as by a spring. A spring-box treatment system 20 disposed on the site 11. The spring box treatment system 20 is disposed to intercept the surface water 12 and to divert the surface water into the spring box treatment system 20 to remove contaminants such as volatile hydrocarbons and, in particular, chlorinated hydrocarbons which may exist in the water in the aquifer 14. The spring box treatment system 20 outputs a water stream 16 which is substantially free of the contaminants.

Contaminants which can be treated or removed by use of the spring box treatment system 20 include hydrocarbons and, in particular, volatile chlorinated hydrocarbons such as tetrachloroethene, trichloroethene, cisdichloroethene, transdichloroethene, 1-1-dichloroethene and vinyl chloride. In particular, other materials can also be removed from the stream including chloroalkanes, including 1,1,1 trichloroethane, 1,1, dichloroethane, methylene chloride, and chloroform; benzene, toluene, ethylbenzene, O-xylene, P-xylene, naphthalene and methyltetrabutylether (MTBE). It should be understood that the use of the spring-box treatment system 20 is not limited to flowing surface water but could be used to treat pumped or stored water.

Referring now to FIG. 2, the spring box treatment system 20 includes a spring box 30, and an air compressor 22, a compressor/pump control mechanism 24, and an ozone ($O_3$) generator 26. The air compressor 24 can feed a stream of air into the spring box 30 whereas, the compressor pump control 24 feeds a stream of air mixed with ozone ($O_3$) from the ozone generator 26 into the spring box 30 to affect substantial removal of the above-mentioned or similar types of contaminants. Optionally, or in addition thereto, the apparatus 20 can also include a pump 28 that supplies a liquid decontamination agent such as hydrogen peroxide or catalyst agents including iron containing compounds such as iron silicates or palladium or palladized carbon. To promote biodegradation reactions, the liquid introduced can be a nutrient mixture of nitrogen (ammonium or nitrate), phosphorus, and potassium along with oxygen as a gas to promote oxic reactions or carbon dioxide and hydrogen sulfide to promote reduction reactions.

The spring box 30 uses primarily a gas-gas reaction between contaminant vapors and ozone (described below). This reaction can be supplemented with a liquid phase reaction. A liquid decontaminator such as hydrogen peroxide can also be used. The use of hydrogen peroxide as a thin film coating on the bubbles promotes the decomposition rate by adding a secondary liquid phase reactive interface as volatile compounds enter the gaseous phase. It also expands the types of compounds that can be effectively removed. Alternatively, the pump control 28 can simply feed water.

Figure 3B:
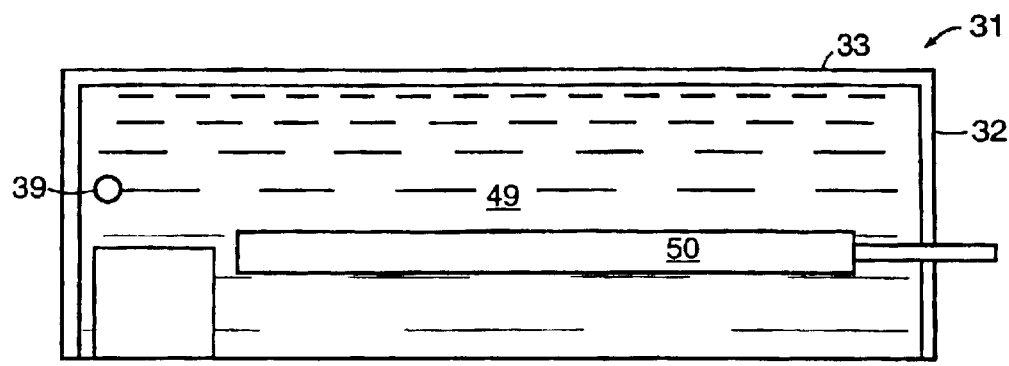
FIGS. 3A and 3B are respectively plan and elevational views somewhat schematic, of a spring box used in the apparatus of FIG. 2.
Figure 3A:
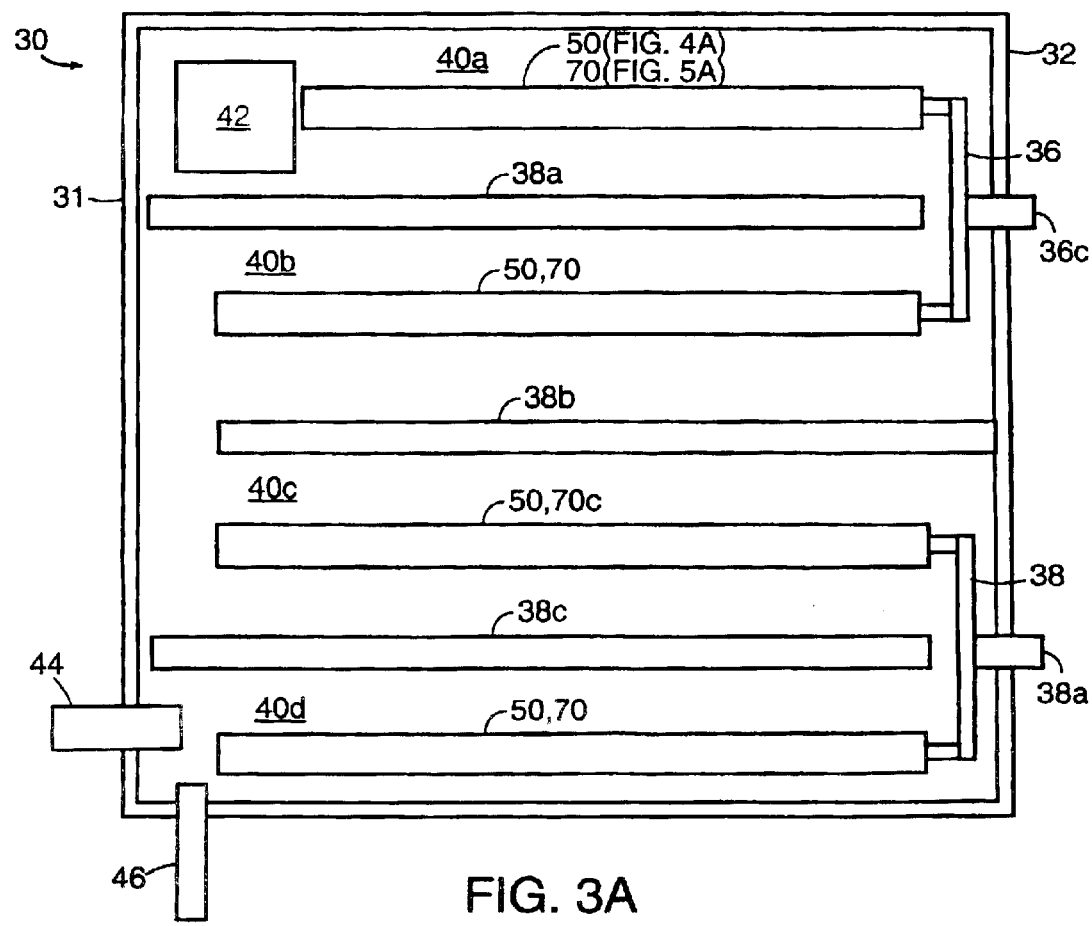

Referring now to FIGS. 3A and 3B, an arrangement of a spring box 30 is shown. The spring box includes a container 31 comprised of a sidewall 32 of a durable material such as concrete over which is disposed or attached a water tight lid 33 also comprised of concrete. Within the spring box 30 is provided an inlet port 42 to receive the water from the spring, as well as a plurality of partially closed chambers 40a–40d which are formed within the interior of the spring box by walls or partitions 38a–38c. Within each of the chambers 40a–40d are disposed a plurality of microporous diffusers such as those shown in conjunction with my issued U.S. Pat. No. 5,855,775 which is incorporated herein by reference. Alternatively, microporous diffusers 50, 70, as described below in conjunction with FIGS. 4A and 4B or FIGS. 5A and 5B may be used.

In the arrangement shown in FIG. 3A, a first pair of microporous diffusers 50a, 50b or 70a, 70b are coupled to a common gas/liquid feed arrangement 36a which can be fed, for example, from compressor/pump 24 and compressor 28 (FIG. 2). The spring box 30 also includes a second feed arrangement 38b which in this embodiment has one of the microporous diffusers 50c, 70c being fed with a combination of air, ozone and air, ozone and liquid as above, and with the second microporous diffuser 50d, 70d being fed only by air to provide air stripping of any residual ozone before exiting of the treated water.

As shown in FIG. 3B, the microporous diffusers are arranged in elevation above the bottom of the spring box 30 within a pool 39 of water provided from the spring or other surface water source.

Figure 3C:
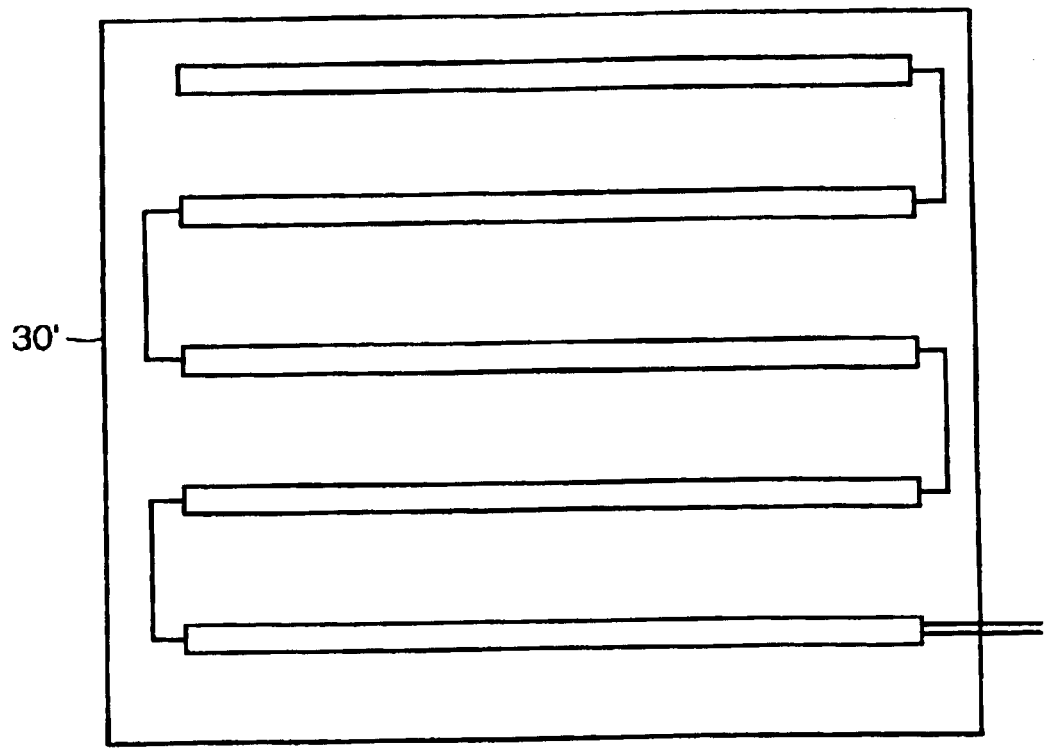
FIGS. 3C and 3D are plan and elevational views of still alternate spring box arrangements.
Figure 3D:
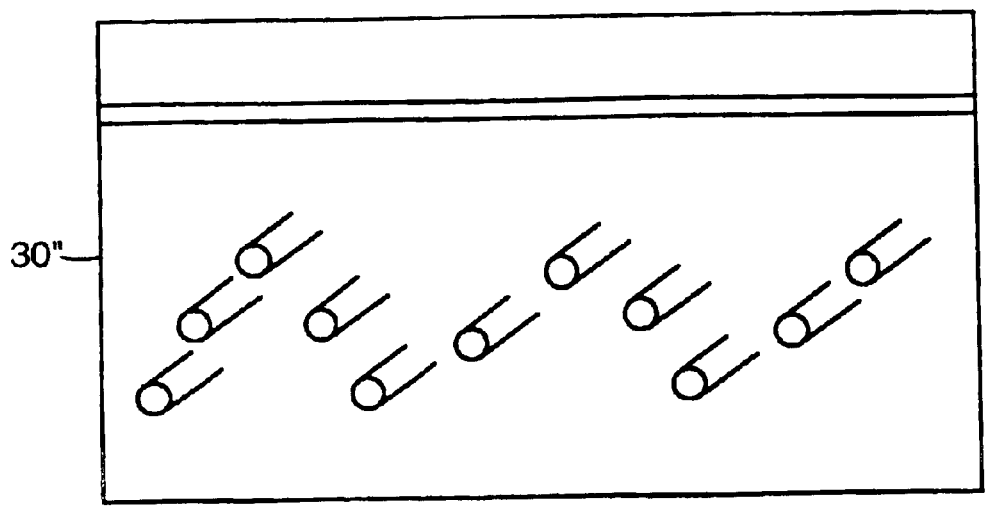

FIGS. 3C and 3D show still alternate spring box arrangements. In the arrangement 30' of FIG. 3C, the diffusers 50 or 70 are coupled in series whereas FIG. 3D shows diffusers 50, 70 arranged to be staggered in elevation over the height of the spring box.

The spring box 30 is an ozone reactor vessel in which ozone is pumped into the pool of water through the use of the microporous diffusers. The microporous diffusers are disposed in the water under treatment and transfer ozone into the water in the form of microfine or fine bubbles which promote rapid gas/gas/water reactions with volatile organic compounds particularly in the presence of a catalyst or enhancer which may participate in the gaseous phase of the reaction, instead of solely enhancing dissolved aqueous disassociation and reactions. In addition, with the optional use of the liquid port to the apparatus, the gas/gas reactions are optimized to include gas/gas reactions within the gaseous phase as well as inducing water aqueous phased reactions to achieve an overall decomposition rate within the gaseous phase and the aqueous phase from second water reactions. For example, the use of hydrogen peroxide as a laminate coating on the bubbles can enhance decomposition rates as mentioned below. The micron plastic bubblers may also be coated with or have sintered into construction an outer layer of activated carbon or activated carbon with palladium to simultaneously accumulate and promote decomposition of the chloroethenes.

The production of microbubbles and selection of appropriate size distribution are selected for optimized gas exchange through high surface area to volume ratio and long residence time within the liquid to be treated. The microbubbles are generated by using microporous materials in the microporous diffuser 50 that acts as a bubble chamber, as shown in the embodiment 50 (FIGS. 4A–4B) or, alternatively, through the embodiment 70 of the microporous diffuser of FIGS. 5A–5B. The apparatus 20 promotes the continuous production of microbubbles minimizing coalescing or adhesion. The injected air/liquid combination moves as a fluid into the water to be treated; whereas, microencapsulated ozone within the microfine bubbles enhances and promoted in-situ stripping of volatile organics and simultaneously terminates normal reversible Henry's reaction.

Figure 4A:
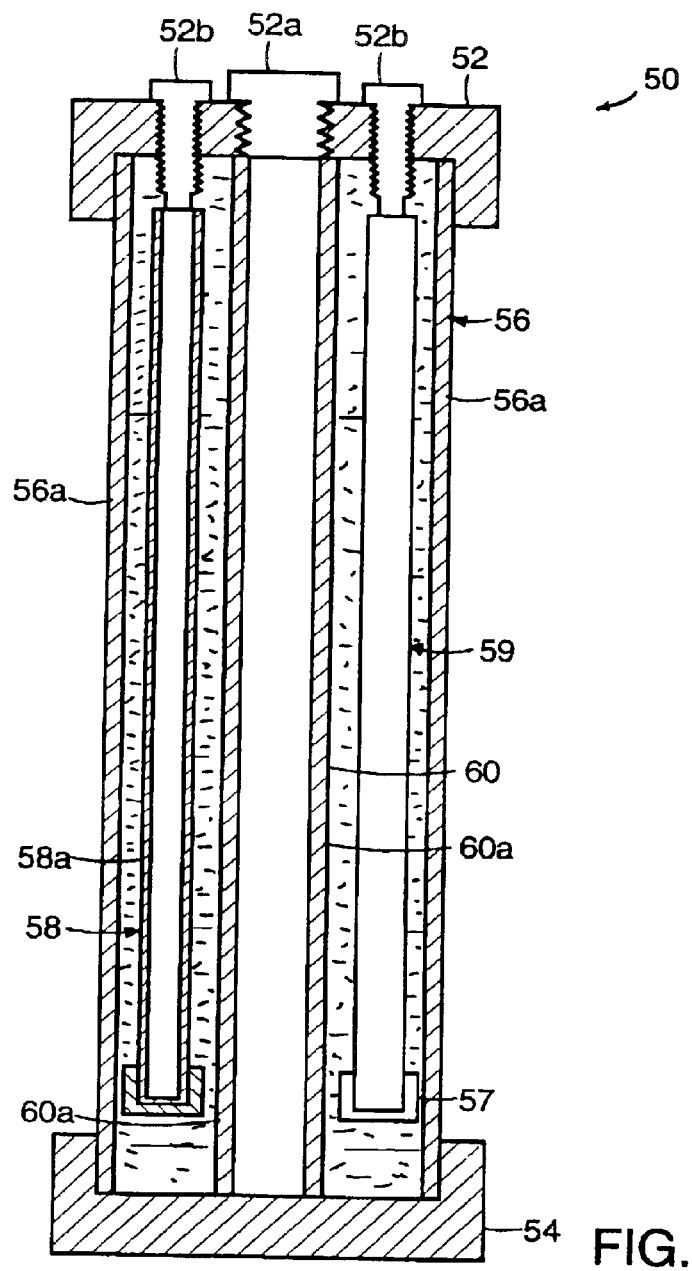
FIGS. 4A and 4B are longitudinal cross-section and plan cross-sectional views of a microporous diffuser useful in the spring box of FIGS. 3A and 3B.
Figure 4B:
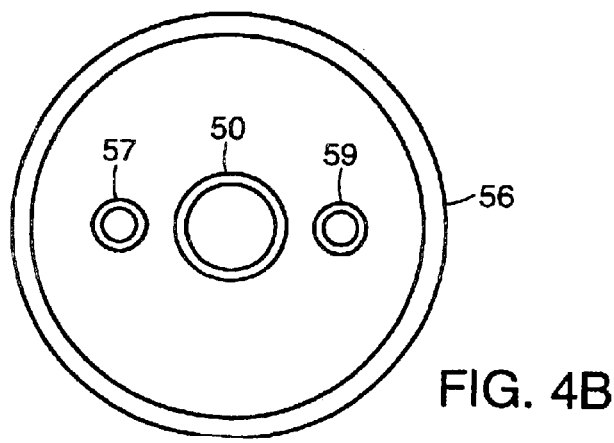

Referring now to FIGS. 4A–4B, a microporous diffuser 50 is shown. The microporous diffuser 50 includes a first cylindrical member 56 comprised of a hydrophobic material which provides an outer cylindrical shell for the microporous diffuser 50. The cylindrical member 56 has a sidewall 56a which is comprised of a large plurality of micropores. A second cylindrical member 60 is coaxially disposed within the first cylindrical member 56. The second cylindrical member 60 is comprised of a hydrophobic material and has a sidewall 60a which is comprised of a large plurality of micropores. Also disposed within the confines of the first cylindrical member 56 are a plurality of cylindrical members 58, here four, which have sidewalls 58a having a large plurality of micropores and also comprised of a hydrophobic material.

A proximate end of central cylindrical member 60 is coupled to a first inlet port 52a which is provided from a first inlet cap 52 and proximate ends of the plurality of cylindrical members 58 are coupled to second inlet ports generally denoted as 52b. At the opposite end of the microporous diffuser 50 an end cap 54 covers distal ends of cylindrical members 56 and 60. Here distal ends of the plurality of cylindrical members 58 are sealed by separate caps 59 but could be terminated by the end cap 54. The end cap 54 in conjunction with cap 52 seals the distal ends of the microporous diffuser. Each of the cylindrical members 56, 58 and 60 are here cylindrical in shape and have a plurality of microscopic openings constructed through sidewalls 56a, 58a and 60a, respectively, thereof having pore sizes matched to or to create a pore size effective for inducing gas/gas reactions in the spring box 30. Sidewalls of each of the cylindrical members can have a pore diameter in a range of 1–200 microns, preferably 1–50 microns and more preferably 5–20 microns. The combination of the inlet cap 52 and end cap 54 seals the microporus diffuser 50 permitting liquid and gas to escape by the porous construction of sidewalls of the microporous diffusers.

The microporous diffuser 50 can be filled with a microporous material such as microbeads with mesh sizes from 20 to 200 mesh or sand pack or porous hydrophilic plastic to allow introducing a liquid into the pore spaces where liquid is exiting.

Figure 5A:
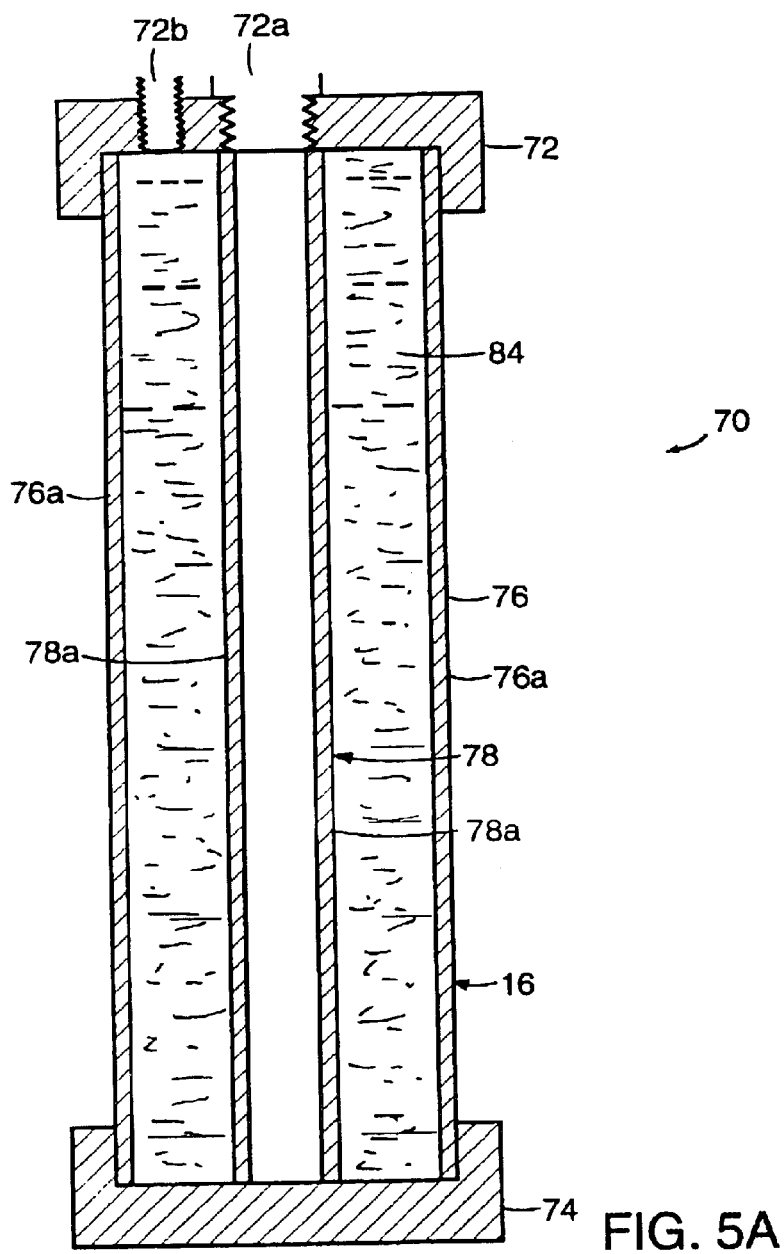
FIGS. 5A, 5B are longitudinal cross-section and plan cross-sectional views, respectively, of an alternative microporous diffuser useful in the spring box of FIGS. 3A and 3B.
Figure 5B:
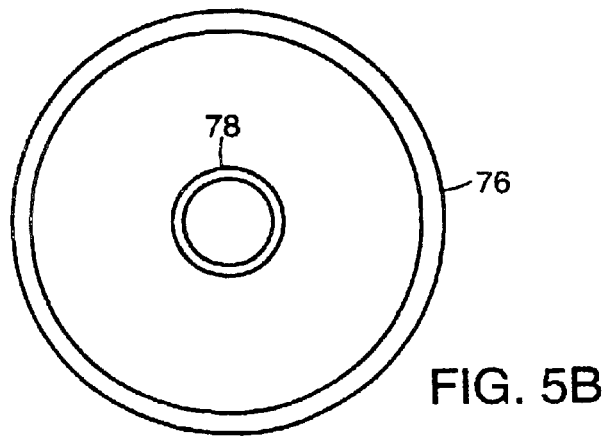

Referring now to FIGS. 5A and 5B, an alternate embodiment 70 of a microporous diffuser is shown. The microporous diffuser 70 includes an outer cylindrical member 76 having a sidewall 76a within which is disposed an inner cylindrical member 78 having a sidewall 78a. The inner cylindrical member 78 is spaced from the sidewall of the outer cylindrical member. The space 77 between the inner and outer cylindrical members 76, 78 is filled with a packing material comprised of glass beads or silica particles (silicon dioxide) or porous plastic which, in general, are hydrophilic in nature. This space is coupled to an input port 72b which receives liquid, and catalysts, and/or nutrients from pump 39 (FIG. 2). The microporous diffuser 70 has the inner cylindrical member 78 disposed coaxial or concentric to cylindrical member 78. Sidewalls of each of the cylindrical members can have a pore diameter in a range of 1–200 microns, preferably 1–50 microns and more preferably 5–20 microns. A proximate end of the inner cylindrical member is coupled to an inlet port 72a which is fed an air ozone mixture from pump 36. The microporous diffuser also includes an end cap 74 which in combination secures distal ends of the cylinders 76 and 78. The combination of the inlet cap 72 and end cap 74 seals the microporus diffuser permitting liquid and gas to escape by the porous construction of sidewalls of the microporous diffusers.

Figure 6A:
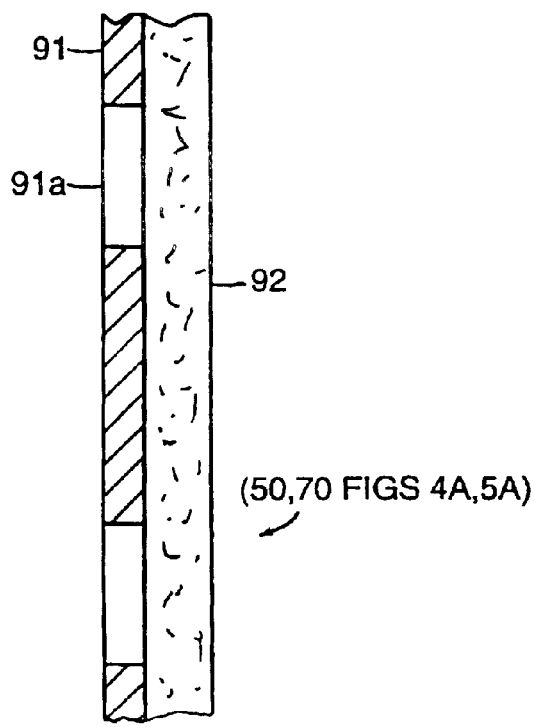
FIGS. 6A and 6B are cross-sectional view of sidewalls of the microporous diffusers of either FIGS. 4A, 4B or 5A, 5B showing exemplary construction details.
Figure 6B:
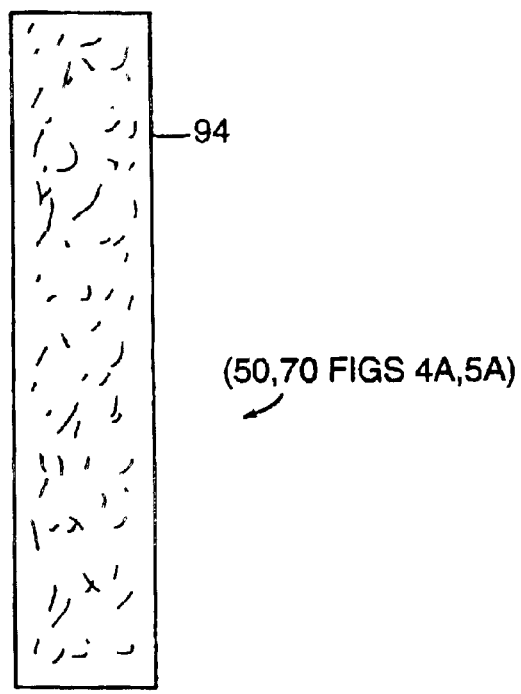

Referring now to FIGS. 6A, 6B, construction details for the elongated cylindrical members for the microporous diffusers 50, 70 are shown. As shown in FIG. 6A, sidewalls of the members can be constructed from a metal or a plastic support layer 91 having large (as shown) or fine perforations 91a over which is disposed a layer of a sintered i.e., heat fused microscopic particles of plastic. The plastic can be any hydrophobic material such as polyvinylchloride, polypropylene, polyethylene, polytetrafluoroethylene, high density polyethylene (HDPE) and ABS. The support layer 91 can have fine or coarse openings and can be of other types of materials. FIG. 6B shows an alternative arrangement 94 in which sidewalls of the members are formed of a sintered i.e., heat fused microscopic particles of plastic. The plastic can be any hydrophobic material such as polyvinylchloride, polypropylene, polyethylene, polytetrafluoroethylene, high density polyethylene (HDPE) and alkylbenzylsulfonate (ABS).

The fittings (i.e., the inlets in FIGS. 4A, 5A can be threaded and are attached to the inlet cap members by epoxy, heat fusion, solvent or welding with heat treatment to remove volatile solvents or other approaches. Standard threading can be used for example NPT (national pipe thread) or box thread e.g., (F480). The fittings thus are securely attached to the microporous diffusers in a manner that insures that the microporous diffusers can handle pressures that are encountered with injecting of the air/ozone and liquid.

Figure 7A:
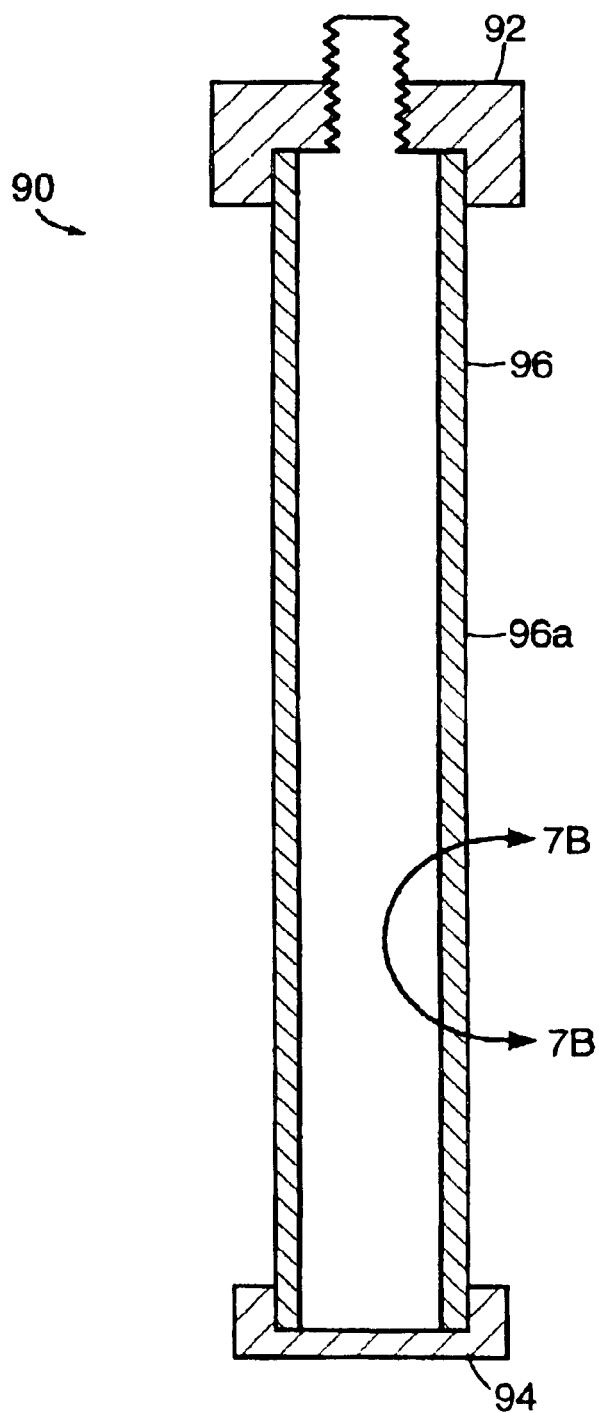
FIGS. 7A, 7B are longitudinal cross-section and plan cross-sectional views, respectively, of a still alternative microporous diffuser useful in the spring box of FIGS. 3A–3D.
Figure 7B:
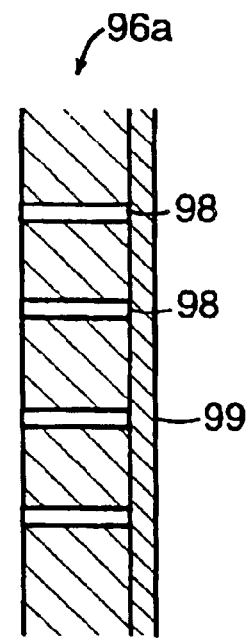

Referring to FIGS. 7A–7B, an alternate microporous diffuser 90 is shown. The microporous diffuser 90 includes a first cylindrical member 96 comprised of a hydrophobic material which provides an outer cylindrical shell for the microporous diffuser 90. The cylindrical member 96 has a sidewall 96a that is comprised of a large plurality of micro pores. A proximate end of cylindrical member 96 is coupled to a first inlet port 92a provided from a first inlet cap 92 and a distal end of the cylindrical member 96 is coupled to an end cap 94 The end cap 94 in conjunction with cap 92 seals the ends of the microporous diffuser 90. Sidewalls of the cylindrical members 96 is provided with a film of a catalysts or reaction promoter or and absorbing material. Examples include a layer 93 of activated carbon that is abraded into the surface or sintered into the surface. Additionally palladized activated carbon could also be used. As explained above the layer 93 can aid in decomposition of the contaminants in the water. Sidewalls of each of the cylindrical members can have a pore diameter in a range of 1–200 microns, preferably 1–50 microns and more preferably 5–20 microns.

The use of catalysts supported by absorptive materials such as palladized activated carbon can be particularly effective for compounds that have an absorptive affinity to activated carbon. The compounds such as TCE are concentrated near the release location of the ozone micro bubbles, allowing more efficient reaction for water containing lower concentrations of TCE as explained above. The layer 93 can also be provided on the other embodiments 50, 70 above, e.g., on either or both cylindrical members but preferably on the members that deliver the ozone to the water.

Figure 8A:
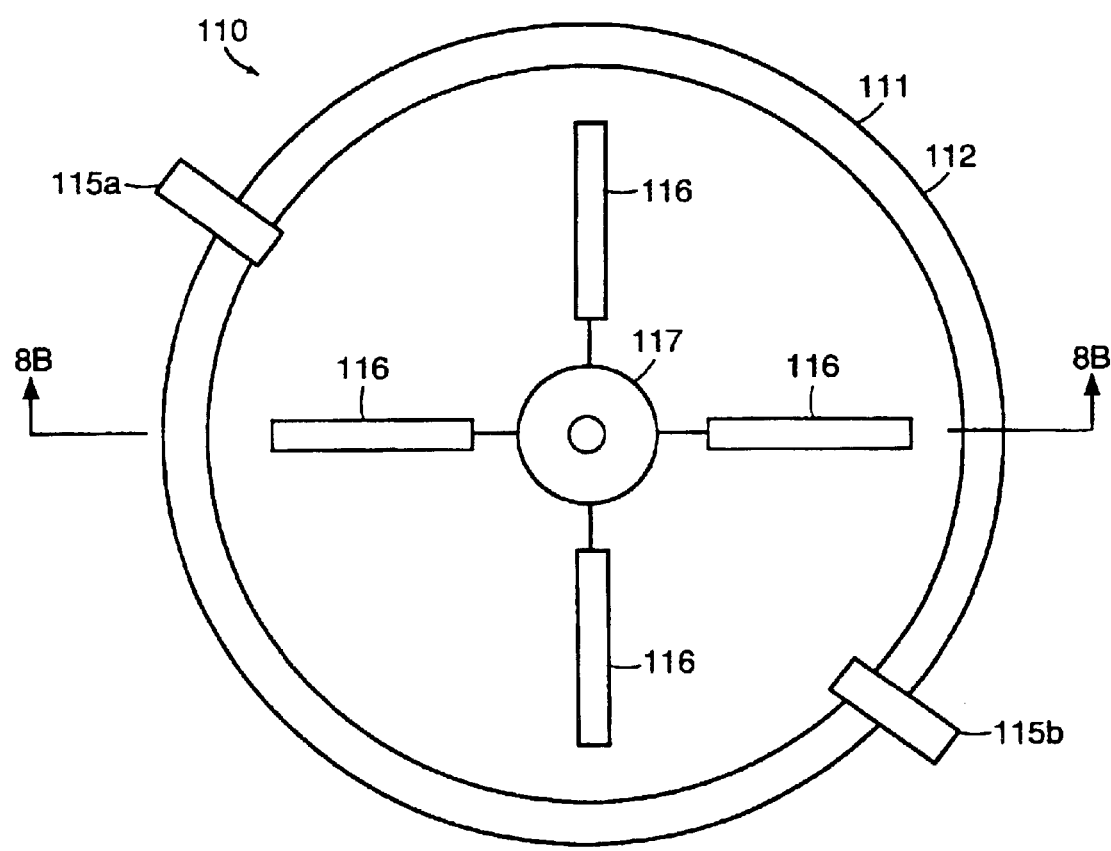
FIGS. 8A and 8B are respectively plan and elevational views somewhat schematic, of a circular spring box arrangement with a mixing feature also useful in the apparatus of FIG. 2.
Figure 8B:
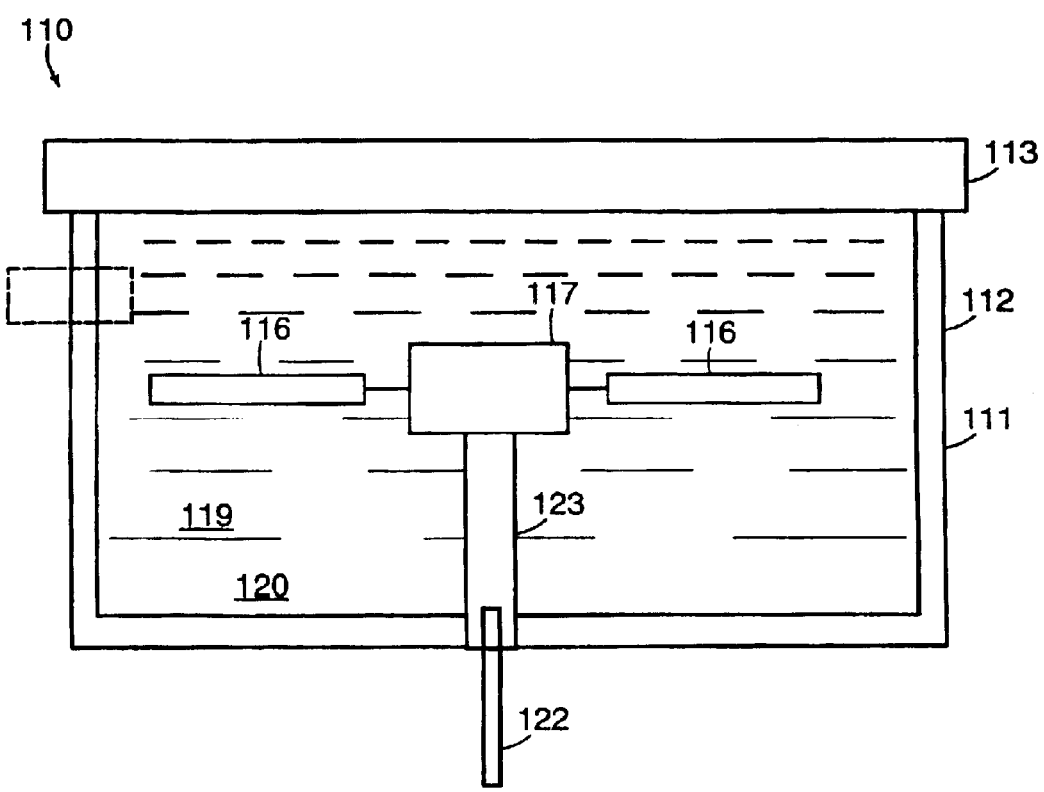

Referring now to FIGS. 8A and 8B, an alternate arrangement of a spring box 110 is shown. The spring box 110 includes a circular container 111 comprised of a sidewall 112 of a durable material such as concrete over which is disposed or attached a water tight lid 113 also comprised of concrete. Within the spring box 110 is provided an inlet port 115a to receive the water from the spring. Within the circular container are disposed a plurality of microporous diffusers such as those shown in conjunction with my issued U.S. Pat. No. 5,855,775 which is incorporated herein by reference. Alternatively, microporous diffusers 50, 70, 90, as described above in conjunction with FIGS. 4A and 4B, FIGS. 5A and 5B, or FIGS. 7A–7B may be used.

In the arrangement shown in FIG. 8A, the microporous diffusers 116 are coupled to a common rotary joint 117 that can provides a gas/ozone feed arrangement 86a which can be fed, for example, from compressor/pump 24 and compressor 28 (FIG. 2).

As shown in FIG. 8B, the microporous diffusers are arranged in elevation above the bottom of the spring box 110 within a pool 119 of water provided from the spring or other surface water source. The rotary joint 117 enables the microporous diffusers to be rotated in the water enabling the ozone to more effectively mix with the water. The spring box 110 can include a sand or other matrix 120 containing a reaction promoter e.g., catalyst as mentioned.

The spring box 110 is an ozone reactor vessel in which ozone is pumped into the pool of water through the use of the microporous diffusers. The microporous diffusers 116 are disposed in the water under treatment and transfer ozone into the water in the form of micro fine or fine bubbles which promote rapid gas/gas/water reactions with volatile organic compounds particularly in the presence of a catalyst or enhancer which may participate in the gaseous phase of the reaction, instead of solely enhancing dissolved aqueous disassociation and reactions.

In addition, an optional liquid port (not shown) to the rotary joint can be provided to include gas/gas reactions within the gaseous phase as well as inducing water aqueous phased reactions to achieve an overall decomposition rate within the gaseous phase and the aqueous phase from second water reactions. For example, the use of hydrogen peroxide as a laminate coating on the bubbles can enhance decomposition rates as mentioned above.

Figure 9:
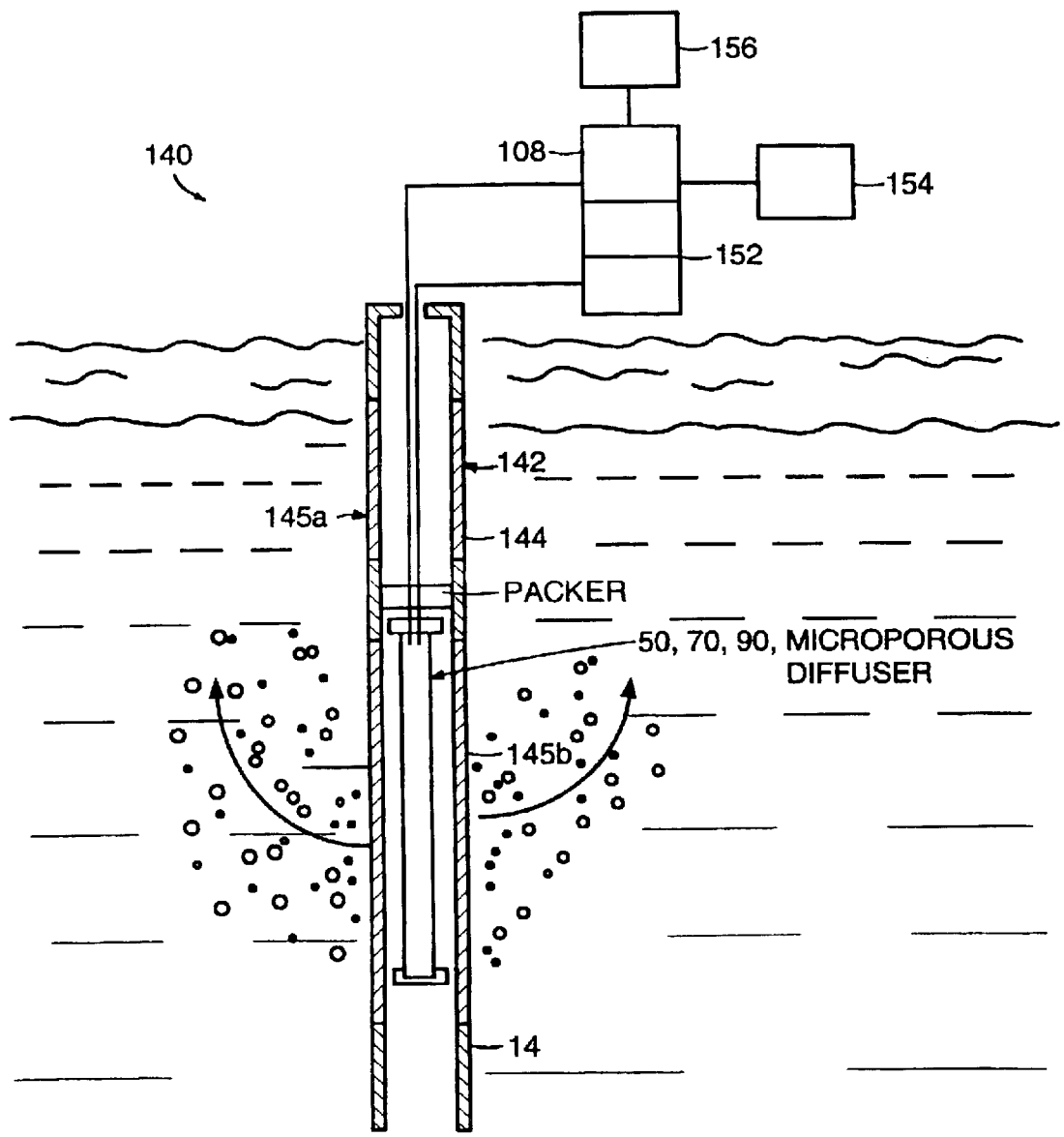
FIG. 9 is a cross-sectional view showing an alternative treatment example.

Referring now to FIG. 9, an alternative example of the use of the microporous diffusers 50, 70 is shown. The example shows an injection well to treat subsurface waters of an aquifer. The arrangement includes a well having a casing with an inlet screen and outlet screen to promote a recirculation of water into the casing and through the surrounding ground area. The casing supports the ground about the well. Disposed through the casing is microporous diffusers e.g., 50 or 70. The injection well treatment system 120 also includes an air compressor 132, a compressor/pump control mechanism 134, and an ozone ($O_3$) generator 136. The air compressor 134 can feed a stream of air into the microporous diffuser 50 whereas, the compressor pump control 134 feeds a stream of air mixed with ozone ($O_3$) from the ozone generator 136 into microporous diffuser to affect substantial removal of the above-mentioned or similar types of contaminants. Optionally, or in addition thereto, the treatment system 120 can also include a pump 138 that supplies a liquid decontamination agent such as hydrogen peroxide as well as nutrients and catalyst agents including iron containing compounds such as iron silicates or palladium containing compounds such as palladized carbon. In addition, other materials such as platinum may also be used.

The treatment system 140 makes use of a gas-gas reaction of contaminant vapors and ozone (described below) that can be supplemented with a liquid phase reaction. The use of hydrogen peroxide as a thin film coating on the bubbles promotes the decomposition rate by adding a secondary liquid phase reactive interface as volatile compounds enter the gaseous phase. It also expands the types of compounds that can be effectively removed. Alternatively, the pump control 154 can simply feed water.

In particular, with the microporous diffusers 50 and 70 and use of the optional port to introduce a liquid such as hydrogen peroxide or water into the chamber, the microbubbles are produced in the microporous diffuser by bubbling air/ozone through the central cylinder of the microporous diffusers and into the surrounding outer regions of the microporous diffusers. At the same time, a liquid is introduced into the microporous diffusers 50, 70 and laminates an outer surface of bubbles formed by the gas. The liquid forms a liquid barrier between the water to be treated and the inside gas containing air/ozone. This arrangement thus can be injected into a slurry containing a catalyst such as silicate, iron silicate, palladium, palladized carbon or titanium dioxide to produce rapid reactions to decompose contaminants within the pool of water contained in the spring box 30. The reactions can proceed as set out below.

The process uses microfine bubble injection to produce simultaneous extraction/decomposition reactions as opposed to simply creating smaller and smaller sized bubbles for the purpose of injecting into free water. The process involves generation of fine bubbles which can promote rapid gas/gas/water reactions with volatile organic compounds which a substrate (catalyst or enhancer) participates in, instead of solely enhancing dissolved (aqueous) disassociation and reactions. The production of microbubbles and selection of appropriate size distribution is provided by using microporous material and a bubble chamber for optimizing gaseous exchange through high surface area to volume ratio and long residence time within the liquid to be treated. The equipment promotes the continuous production of microbubbles while minimizing coalescing or adhesion.

The injected air/liquid combination moves as a fluid into the water to be treated. The use of microencapsulated ozone enhances and promotes in-situ stripping of volatile organics and simultaneously terminates the normal reversible Henry's reaction. The process involves promoting simultaneous volatile organic compounds (VOC) in-situ stripping and gaseous decomposition, with moisture (water) and substrate (catalyst or enhancer). The reaction mechanism is not a dissolved aqueous reaction. In some cases, with cis- or trans-DCE, the aqueous phase reaction may assist the predominantly gas-phase reaction.

The remote process controller and monitor allows for the capability for sensor feedback and remote communication to the pump control 24 and ozone (or oxygen or both) generator 26 to achieve a certain level of gaseous content (e.g., dissolved oxygen, ozone, or other gas) and rate of mixing to promote efficient reactions. This is done by sensors 39 (FIGS. 3A, 3B) placed in the bubble chambers at certain distances from the microporous diffusers 50, 70. Oxygen content, redox potential, and dissolved VOC concentration of the water can be monitored within the treatment system. The operator can access the information, modify operations and diagnose the condition of the unit by telephone modem or satellite cell phone. This provides on-site process evaluation and adjustment without the need of on-site operator presence.

Appropriately sized microfine bubbles can be generated in a continuous or pulsing manner which allows alternating water/bubble/water/bubble fluid flow. The microfine bubbles substantially accelerate the transfer rate of volatile organic compounds like PCE from aqueous to gaseous state. Reducing the size of the bubbles to microfine sizes, e.g., 5 to 50 microns, can boost extraction rates. These sizes boost exchange rates and do not tend to retard rise time by too small a size. When an oxidizing gas (ozone) is added into the microbubbles, the rate of extraction is enhanced further by maintaining a low interior (intrabubble) concentration of PCE, while simultaneously degrading the PCE by a gas/gas/water reaction. The combination of both processes acting simultaneously provides a unique rapid removal system which is identified by a logarithmic rate of removal of PCE, and a characteristic ratio of efficiency quite different from dissolved (aqueous) ozone reactions. The compounds commonly treated are HVOCs (halogenated volatile organic compounds), PCE, TCE, DCE, vinyl chloride (VC), petroleum compounds (BTEX: benzene, toluene, ethylbenzene, xylenes).

An analysis of the reaction mechanism is set out. Gaseous exchange is proportional to available surface area. With partial pressures and mixtures of volatile gases being held constant, a halving of the radius of bubbles would quadruple (i.e., times) the exchange rate. If, in the best case, a standard well screen creates air bubbles 200 times the size of a medium sand porosity, a microporous diffuser of 5 to 20 micron size creates a bubble 1/10 the diameter and six to ten times the volume/surface ratio as shown in Table 1.

TABLE 1

| Diameter (microns) | Surface Area $4\pi$ | Volume $4/3\pi$ | Surface Area/Volume |
|---|---|---|---|
| 200 | 124600 | 4186666 | 0.03 |
| 20 | 1256 | 4186 | 0.3 |

Theoretically, the microporous bubbles exhibit an exchange rate of ten times the rate of a comparable bubble from a standard ten slot well screen.

TABLE 2

Surface to Volume (A/V) Ratio Changes As Function of Bubble Size As Bubble Volume Increases

| D(i.e.,2r) or h as Fraction of Pore Size | 0.1 | 0.25 | 0.5 | 1 | 2 | 5 | 10 | 20 |
|---|---|---|---|---|---|---|---|---|
| Sphere | | | | | | | | |
| Area = $4\pi r^2$ | 0.0314 | 0.19625 | 0.785 | 3.14 | 18.8 | 37.7 | 69 | 131 |
| Vol = $4/3\pi r^3$ | 0.0005 | 0.00817 | 0.065 | 0.53 | 6.3 | 15.7 | 31 | 62 |
| Ratio | 62 | 24 | 12 | 5.9 | 3 | 2.4 | 2.2 | 2.1 |

(Spheroid header spans Area, Vol, Ratio rows.)

In wastewater treatment, the rate of transfer between gas and liquid phases is generally proportional to the surface area of contact and the difference between the existing concentration and the equilibrium concentration of the gas in solution. Simply stated, if the surface to volume ratio of contact is increased, the rate of exchange also increases as illustrated in Table 2. If, the gas (VOC) entering the bubble (or micropore space bounded by a liquid film), is consumed, the difference is maintained at a higher entry rate than if the VOC is allowed to reach saturation equilibrium. In the case of a halogenated volatile organic carbon compound (HVOC), PCE, gas/gas reaction of PCE to by-products of HCl, $CO_2$ and $H_2O$ accomplishes this. In the case of petroleum products like BTEX (benzene, toluene, ethylbenzene, and xylenes), the benzene entering the bubbles reacts to decompose to $CO_2$ and $H_2O$. The normal equation for the two-film theory of gas transfer is:

$r_m = K_g A(C_g - C)$ where:
  $r_m$ = rate of mass transfer
  $K_g$ = coefficient of diffusion for gas
  A = area through which gas is diffusing
  $C_g$ = saturation concentration of gas in solution
  C = concentration of gas in solution.

The restatement of the equation to consider the inward transfer of phase change from dissolved HVOC to gaseous HVOC in the inside of the bubble would be:

$C_s$ = Saturation concentration of gas phase of HVOC or VOC in bubble.
C = Initial concentration of gaseous phase of HVOC or VOC in bubble volume.

Soil vapor concentrations are related to two governing systems: water phase and (non-aqueous) product phase. Henry's and Raoult's Laws are commonly used to understand equilibrium-vapor concentrations governing volatilisation from liquids. When soils are moist, the relative volatility is dependent upon Henry's Law. Under normal conditions (free from product) where volatile organic carbons (VOCs) are relatively low, an equilibrium of soil, water, and air is assumed to exist. The compound tetrachloroethene (PCE) has a high exchange capacity from dissolved form to gaseous form. If the surface/volume ratio is modified at least ten fold, the rate of removal should be accelerated substantially.

Figure 10:
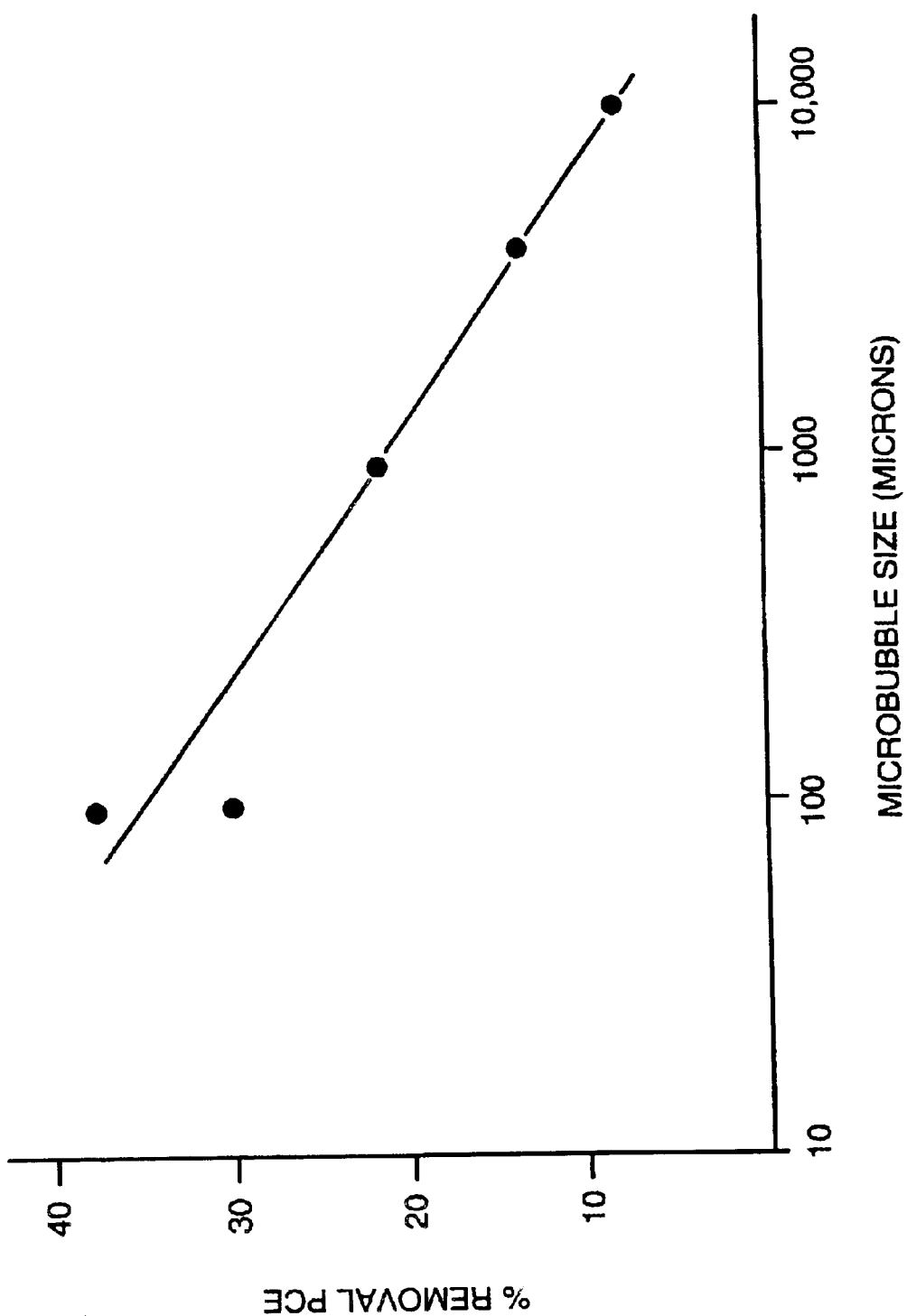
FIG. 10 is a plot of removal rate of PCE for an aqueous solution equivalent to 120 ppb, over differing bubble sizes.

FIG. 10 shows a plot of removal rate of PCE for an aqueous solution equivalent to 120 ppb, over differing bubble sizes. The air volume and water volume is held constant. The only change is the diameter of bubbles passed through the liquid from air released from a diffuser.

Ozone is an effective oxidant used for the breakdown of organic compounds in water treatment. The major problem in effectiveness is that ozone has a short lifetime. If ozone is mixed with sewage containing water above ground, the half-life is normally minutes. Ozone reacts quantitatively with PCE to yield breakdown products of hydrochloric acid, carbon dioxide, and water.

To offset the short life span, the ozone is injected with microporous diffusers, enhancing the selectiveness of action of the ozone. By encapsulating the ozone in fine bubbles, the bubbles would preferentially extract volatile compounds like PCE from the mixtures of soluble organic compounds they encountered. With this process, volatile organics are selectively pulled into the fine air bubbles. Gas entering a small bubble of volume ($4\pi r^3$) increases until reaching an asymptotic value of saturation. If we consider the surface of the bubble to be a membrane, a first order equation can be written for the monomolecular reaction of the first order. The reaction can be $$\frac{dx}{dt} = K(Q - X)$$

written as follows:
  where X is the time varying concentration of the substance in the bubble, Q is the external concentration of the substance, and K is the absorption constant.

$X = Q(1 - e^{-Kt})$

If at time t=0, X=0, then:

$$K = \frac{dx/dt}{Q - X}$$

The constant K is found to be:
By multiplying both numerator and denominator by V, the $$K = \frac{v\,dx/dt}{v(Q - X)}$$

volume of the bubble, we obtain
which is the ratio between the amount of substance entering the given volume per unit time and quantity V(Q-X) needed to reach the asymptotic value. By analyzing the concentration change within the fine bubbles sent through a porous matrix with saturated (water filled) solution interacting with the matrix (sand), and determining the rate of decomposition of the products (TCE+ozone=$CO_2$+HCl) and (Benzene+ozone=$CO_2$+HOH), the kinetic rates of reaction can be characterized.

The rate which the quantity $k_1 QV$ of the substance flows in one unit of time from aqueous solution into the bubble is proportional to Henry's Constant. This second rate of decomposition within the bubble can be considered as $k_1$, a second $$\frac{dx}{dt} = k_1 Q - k_2 X$$

rate of reaction ($-k_2 X$), where $$X = \frac{k_1}{k_2} Q$$

and, at equilibrium, as dx/dt=0, gives
However, if the reaction to decompose is very rapid, so $-k_2 X$ goes to zero, the rate of reaction would maximize $k_1 Q$, i.e., be proportional to Henry's Constant and maximize the rate of extraction since VOC saturation is not occurring within the bubbles.

The combination of microbubble extraction and ozone degradation can be generalized to predict the volatile organic compounds amenable to rapid removal. The efficiency of extraction is directly proportional to Henry's Constant. Multiplying the Henry's Constant (the partitioning of VOCs from water to gas phase) times the reactivity rate constant of ozone for a particular VOC yields the rate of decomposition expected by the microbubble process.

The concentration of HVOC expected in the bubble is a consequence of rate of invasion and rate of removal. In practice, the ozone concentration is adjusted to yield 0

$$r_{voc} = -K_L \, a_{voc}(C-C_L)$$

concentration at the time of arrival at the surface.

where:
$f_{voc}$=rate of VOC mass transfer, ($\mu g/ft^3 \cdot h$)
$(K_1 a)_{voc}$=overall VOC mass transfer coefficient, (1/h)
C=concentration of VOC in liquid
$C_L$=saturation concentration of VOC in liquid $\mu g/ft^3$ ($\mu g/m^3$)

The saturation concentration of a VOC in wastewater is a function of the partial pressure of the VOC in the atmosphere in contact with the wastewater.

$$\frac{c_g}{C_L} = H_c \text{ thus, } C_g = H_c \cdot C_L$$

$C_g$=concentration of VOC in gas phase $\mu g/ft^3$ ($\mu g/m^3$)
$C_L$=saturation concentration of VOC in liquid $\mu g/ft^3$ ($\mu g/m^3$)
$H_c$=Henry's Constant The rate of decomposition of an organic compound $C_g$ (when present at a concentration (C) by ozone can be formulated $$-\left(\frac{dC_g}{dt}\right) O_3 = K_{o_c}(O_3)(C_g)$$

by the equation:
or, after integration for the case of a batch reactor:

$$-\ln\left(\frac{C_{g_{end}}}{C_{g_o}}\right) = K_{o_c}(O_3)t \quad \text{(equation 2)}$$

$$(C_g)_{end} = C_o e_{o_c}^{-K}(O_3)t$$

$$\frac{(C_g)_{end}}{(C_g)_o} = e_{o_c}(O_3)t$$

where
$(O_3)$=concentration of ozone averaged over the reaction time (t)
$(C_g)_o$=halocarbon initial concentration
$(C_g)_{end}$=halocarbon final concentration
Substituting:

$$rm = K_g A(C_g - C) \quad \text{From Henry's Law:}$$

$$rm = K_g A((H_g \cdot C_g) - C) \quad C_g = H_c \cdot C_g \quad \text{(equation 3)}$$

$$rm = K_g Z((H_g \cdot C_g) - C) \quad \text{With ozone}$$

$$rm = K_g Z((H_c \cdot C_g) - C - K_o(O_3)(C_g)) \quad \text{(equation 4)}$$

$$(Hg \cdot C) - K_o(O_3)(C_g) = 0$$

Rate of decomposition is now adjusted to equal the total HVOC entering the bubble.

SET: $(H_c \cdot C_g) = K_o (O_3)(C_g)$ (equation 5)

therefore surface concentration=0

This condition speeds up the rate of extraction because the VOC never reaches equilibrium or saturation in the bubble.

Table 4 gives the Henry's Constants ($H_c$) for a selected number of organic compounds and the second rate constants ($R_2$) for the ozone radical rate of reaction in solely aqueous reactions where superoxide and hydroxide reactions dominate. The third column presents rates of removal process.

TABLE 4

REMOVAL RATE COEFFICIENTS

| Organic Compound | Ozone Aqueous Second Order Rate Constant (a.) ($M^{-1}$ $SEC^{-1}$) | Henry's Constant (b.) | Rate Removal Coefficient ($\tau$) (c.) |
|---|---|---|---|
| Benzene | 2 | $5.59 \times 10^3$ | 0.06 |
| Toluene | 14 | $6.37 \times 10^3$ | 0.07 |
| Chlorobenzene | 0.75 | $3.72 \times 10^3$ | 0.013 |
| Dichloroethylene | 110 | $7.60 \times 10^3$ | 0.035 |
| Trichloroethylene | 17 | $9.10 \times 10^3$ | 0.05 |
| Tetrachloroethylene | 0.1 | $25.9 \times 10^3$ | 0.06 |
| Ethanol | 0.02 | $.04 \times 10^3$ | 0.0008 |

(a.) From Hoigne and Bader, 1983. "Rate of Constants of Direct Reactions of Ozone with Organic and Inorganic Compounds in Water-I. Nondissociating Compounds" Water Res/17:173–184.
(b.) From EPA 540/1–86/060, Superfund Public Health Evaluation Manual EPA 540/1–86/060 (OSWER Directive 9285.4-1) Office of Emergency and Remedial Response, Office of Solid Waste and Emergency Response.
(c.) See U.S. Pat. No. 5,855,775.

The rapid removal rate of this process does not follow Hoigne and Bader (1983) rate constants. However, there is a close correlation to Henry's Constant as would be expected from equation 5. The presence of the substrate (sand) and moisture is necessary to complete the reaction. The active ingredient in the sand matrix appears to be an iron silicate. The breakdown products include $CO_2$ and dilute HCl.

Two sets of equations are involved in the reactions:
Dissolved Halogenated Compounds

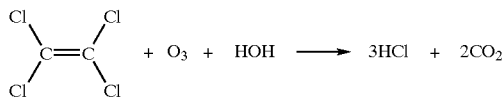

Dissolved Petroleum Distillates

Exemplary compounds are normally unsaturated (double bond), halogenated compounds like PCE, TCE, DCE, Vinyl Chloride, EDB; or aromatic ring compounds like benzene derivatives (benzene, toluene, ethylbenzene, xylenes). Also, pseudo Criegee reactions with the substrate and ozone appear effective in reducing certain saturated olefins like trichloro alkanes (1,1,-TCA), carbon tetrachloride ($CCl_4$), chloroform and chlorobenzene, for instance.

The following characteristics of the contaminants appear desirable for reaction:

Henry's Constant: $10^{-2}$ to $10^{-4}$ $m^3 \cdot atm/mol$
Solubility: 10 to 20,000 mg/l
Vapor pressure: 1 to 3000 mmhg
Saturation concentration: 5 to 9000 $g/m^3$

Absorption-Destruction

Absorptive substrates like activated carbon and certain resins serve to remove dissolved volatile organic carbon compounds by absorption to the surface. The active surface of particles contain sites which the compounds attach to. The surface absorption is usually mathematically modeled by use of a Langmuir or Freunlich set of equations for particular sizes of particles or total surface area if the material is presented in cylinders or successive plates.

The derivation of the Langmuir isotherm stipulated a limited number of absorption sites on the surface of the solid. The absorption of a solute on the surface necessitates the removal of a solvent molecule. An equilibrium is then reached between the absorbed fraction and the remaining concentration in solution. If a continual gas phase of microbubbles is being released from a porous surface, can remove the absorbed molecule and decompose it, the reaction would be moved along much faster $$Q_1 = \frac{K_{LI} C_{LI}}{1 + K_{LI} C_{LI}}$$

than in aqueous phase without the collecting surface.

$Q_1$=fractional surface coverage of solute
$K_{L1}$=equilibrium constant
$C_{L1}$=solute concentration

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method comprising:
   treating an aquifer or soil formation by introducing microfine bubbles including an oxidizing gas into the aquifer or soil formations, the microfine bubbles having a coating of hydrogen peroxide over the microfine bubbles that entrap the oxidizing gas.

2. The method of claim 1 wherein the microporous bubbles are introduced using a microporous diffuser.

3. The method of claim 2 wherein the microporous diffuser includes a catalyst agent.

4. The method of claim 3 wherein the catalyst agent includes iron containing compounds.

5. The method of claim 3 wherein the catalyst agent includes palladium containing compounds.

6. The method of claim 3 wherein the catalyst agent includes platinum.

7. The method of claim 2 wherein the microporous diffuser has an absorptive layer over the surface of the diffusers to remove dissolved volatile organic carbon compounds by absorption to the surface.

8. The method of claim 1 wherein the microfine bubbles have a diameter of less than 200 microns.

9. The method of claim 1 wherein the microfine bubbles have a diameter in the range of about 5 micron to 200 microns.

10. The method of claim 1 wherein the microfine bubbles have a diameter in the range of 5 microns to 50 microns.

11. The method of claim 1 wherein the microfine bubbles having the coating of hydrogen peroxide also include a layer of water disposed to entrap the oxidizing gas.

12. The method of claim 11 wherein the oxidizing gas is ozone.

13. The method of claim 11 wherein the oxidizing gas includes ozone and included in the bubbles with the ozone is air.

14. The method of claim 1 wherein the oxidizing gas is ozone.

15. The method of claim 1 wherein the oxidizing gas includes ozone and included in the bubbles with the ozone is air.

16. A method comprising:
    treating an aquifer or soil formations, by
    introducing an air-ozone stream through a microporous diffuser that is disposed in a wet soil formation producing microfine bubbles of water entrapping air-ozone; and
    introducing a liquid including hydrogen peroxide through the microporous diffuser, to coat surfaces of the microfine bubbles with a coating of the hydrogen peroxide.

17. The method of claim 16 wherein the microporous bubbles are produced by diffusion from a central chamber of the microporous diffuser through microporous materials.

18. The method of claim 17 wherein the microfine bubbles diffuse from the central chamber to a second chamber where they are coated with the hydrogen peroxide to provide the coating of hydrogen peroxide and pass through second microporous materials to produce the microfine bubbles with a coating of the hydrogen peroxide.

19. The method of claim 16 wherein the microporous diffuser includes a catalyst agent.

20. The method of claim 16 wherein the microfine bubbles have a diameter of less than about 200 microns.

21. A method comprising:
    treating an aquifer or soil formations by
    introducing an air-ozone stream through a first centrally disposed member, having sidewalls of a microporous material, that is disposed in a wet soil formation to produce microfine bubbles of water entrapping air-ozone; and
    introducing a liquid including hydrogen peroxide through a space between the first centrally disposed member and a second member that surrounds the first centrally disposed member and which is in fluid communication with the first centrally disposed member to coat surfaces of the microfine bubbles with a coating of the hydrogen peroxide.

22. The method of claim 21 wherein sidewalls of the second member include a adsorptive surface layer.

23. The method of claim 21 wherein the microfine bubbles have a diameter of less than about 200 microns.

24. The method of claim 21 wherein the microporous diffuser has an absorptive layer over the surface of the diffusers to remove dissolved volatile organic carbon compounds by absorption to the surface.

25. The method of claim 21 wherein space between the first and second members is filled with a hydrophilic packing material.

26. The method of claim 21 wherein space between the first and second members is filled with a packing material comprised of glass beads, silica particles or porous plastic, and receives the hydrogen peroxide.

* * * * *